United States Patent Office 2,717,250
Patented Sept. 6, 1955

2,717,250

FORMYLATION OF TETRAHYDRO-10-FORMYL-PTEROIC ACID AND AMINO ACID AMIDES

Martin E. Hultquist, Bound Brook, and Barbara Roth, Middlesex Borough, N. J., assignors to American Cyanamid Company, New York, N. Y., a corporation of Maine No Drawing. Application April 29, 1950,
Serial No. 159,152

6 Claims. (Cl. 260—251.5)

This invention relates to new substances having physiological activity and to processes of preparing the same.

In 1948 Sauberlich and Baumann, Journal of Biological Chemistry, 176, page 165 (1948), recognized the existence of a substance that stimulated the growth in a synthetic medium of *Leuconostoc citrovorum*. This unknown substance was found to be present in commercial liver extracts and also in liver and a wide variety of natural materials. Subsequent work has shown that the growth factor was not pteroylglutamic acid, vitamin $B_{12}$, or any of the other previously identified vitamins that occur in liver and other natural products. It has also been subsequently found that the unknown substance can replace the folic acid requirement of micro-organisms and chicks. It has further been found that the growth factor will reverse the action of pteroylglutamic acid antagonists and, surprisingly, will reverse the toxic effects of aminopterin (N-[4-{[(2,4-diamino-6-pyrimido[4.5-b]-pyrazyl)methyl]amino}benzoyl]glutamic acid) in mice and bacteria, under conditions in which pteroylglutamic acid is ineffective.

The *citrovorum* factor exists in natural products in extremely minute quantities so that its recovery therefrom is exceedingly difficult and practically impossible from a commercial point of view. However, we have discovered that it is possible to prepare compounds having the same or related biological activity by a process which makes the production of adequate amounts of the activity a commercial possibility so that it may be used in medicine. Since the chemical structure of the *Leuconostoc citrovorum* growth factor described by Sauberlich et al. has not been elucidated as yet, it is not possible to say at this time whether any of the products produced by the process described hereinafter are the same or not, even though they have the same biological activity. Insofar as we are aware, however, the products covered by the present invention are new.

The new compounds of the present application, which is a continuation-in-part of our copending application, Serial Number 153,484, filed April 1, 1950, may be prepared by formylating tetrahydropteroic acid and the amino acid amides thereof, particularly tetrahydropteroylglutamic acid, tetrahydropteroylglutamylglutamyl-glutamic acid, and other amino acid amides of tetrahydropteroic acid such as those of aspartic acid, alanine, serine, and others. The salts of these compounds may be used in the process as well.

The tetrahydropteroic acid and its amides may be obtained by the reduction of pteroic acid and/or a desired amide thereof, the reduction being conducted in such a manner that two mols of hydrogen are absorbed. A representative procedure is as follows:

Ten (10) g. of pteroylglutamic acid (90% pure, 10% water) is slurried in 300 cc. of glacial acetic acid, 200 cc. of dry ethylene glycol and 1.0 g. of platinum oxide is added and the reduction is conducted in a stirred vessel at room temperature with vigorous agitation. Hydrogen is absorbed rapidly under these conditions and in about 2 hours approximately 2 mols of hydrogen is absorbed as measured from a calibrated reservoir vessel. A complete solution results at the end of the reduction. After standing for about 16 hours at room temperature, the catalyst is filtered off and washed with a little acetic acid. The resulting clear solution is poured into about 2 liters of methyl acetate from which a solid product precipitates. This is filtered, washed with more ethyl acetate and dried in the vacuum desiccator. The yield is 4.3 g. of tetrahydropteroylglutamic acid. By use of ether as precipitant, somewhat higher yields of product are obtained.

The exact structure of the new compounds produced by formylation of tetrahydropteroic acid or one of its amides has not been definitely determined as yet due to their complex nature. It is believed, however, that they may be represented by one of the following formulae:

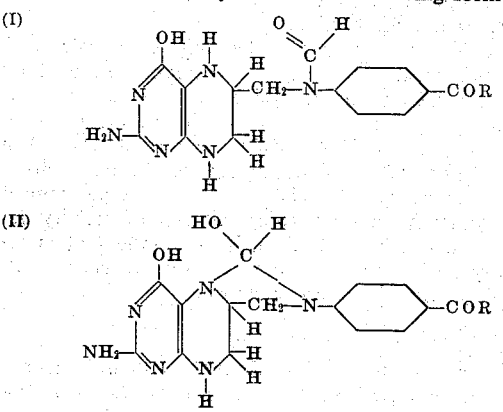

In these, R represents a hydroxyl group or a radical of an amino acid. It will be understood that both of the above may exist in tautomeric forms depending upon the conditions in which they are present.

Various formylating agents may be used to prepare the new compounds of the present invention by reaction on reduced pteroic acid or pteroic acid amides. The preferred formylating agents are formic acid and the esters and amides of formic acid and orthoformic acid. Among these may be particularly mentioned formic acid, methyl formate, ethyl formate, butyl formate, benzyl formate, glycol formate, methyl orthoformate, ethyl orthoformate, formamide, formamidine, and formanilide.

The reaction is caused to take place in a solvent which may include an excess of the formic acid, alkyl formate or a solvent of the alcoholic type. The presence of inert solvents in the reaction mixture is permissible. The solvent is essentially anhydrous when an alkyl formate is used.

Basic agents such as alkali-metal alkoxides, pyridine, triethanolamine, and other tertiary amines are generally included in the reaction mixture when alkyl formates are used. We prefer to use 2 to 3 mols of the alkali-metal alkoxides for each mol of tetrahydropteroylglutamic acid. Larger excesses of pyridine and tertiary amines have been used.

When alkyl formates are used the temperature of the reaction will vary considerably from about 50° C. to 200° C., with the preferred range being 100° C. to 150° C., and the time required for the reaction to be substantially completed is from thirty minutes to six hours. When formic acid is used the temperature will vary considerably from 0° C. to 100° C.

After the formylation, the product may be directly filtered off, depending upon the solvent used, or the solution may be buffered in aqueous sodium bicarbonate and the resulting solution is found to be active. When desirable to remove the excess formic acid from the reaction mixture, the solution can be poured into ether and the insoluble active product isolated by filtration. Formic acid can also be removed by distillation or by absorption procedures.

The process of the invention will now be illustrated in greater detail by means of the following examples.

*Example 1*

Three samples, 0.80 g. each, of tetrahydropteroylglutamic acid, are dissolved in 20 ml. each of 100% formic acid. One sample (a) is allowed to stand at 0° C. for 1 hour, after which it is poured into a mixture of 50 g. sodium bicarbonate and 300 ml. water, giving a volume of 315 ml. This solution contains 570,000 units of activity per ml. of solution. The second sample (b) is allowed to stand at room temperature (25° C.) for one hour and treated like (a), giving a volume of 320 ml. This contains 1.15 million units of activity per ml. of solution. The third sample (c) is heated at 60° C. for one hour and treated as above, giving 325 ml. of solution. This contains 1.56 million units of activity per ml. of solution.

The units of activity are determined by microbiological assay using the synthetic medium described by H. E. Sauberlich et al., J. Biological Chemistry (1948), 176, page 165, and the organism *Leuconostoc citrovorum* 8081; each unit of activity being arbitrarily taken as equivalent to 16.6 millimicrograms of a previous preparation as standard. This unit of activity as determined is approximately equal to twice the unit of activity defined by Sauberlich et al. which is that amount of material per ml. of culture medium necessary to support ½ maximal growth of the test organism.

*Example 2*

A 0.50 g. sample of tetrahydropteroylglutamic acid is mixed with 5 ml. of glycol formate plus 0.15 g. of sodium methylate and heated at 155° C. under nitrogen for 4 hours. After cooling, the light cream-gray solid produced is filtered off and washed with alcohol and ether. This product contains about 320,000 units of the active material per mg. as determined by microbiological assay.

*Example 3*

One g. of tetrahydropteroylglutamic acid is mixed with 12 ml. ethyl formate and 0.3 g. sodium methylate and heated in a sealed tube under nitrogen at 150° C. for 4 hours. The light cream-gray solid is filtered off. It contains about 200,000 units of the active material per mg. as determined by microbiological assay.

*Example 4*

One g. of tetrahydropteroylglutamic acid is mixed with 6 ml. ethyl formate, 6 ml. glycol and 0.3 g. sodium methylate and heated under nitrogen in a sealed tube at 150° C. for 4 hours. The resultant clear light-brown solution is divided in half. One part is poured into an alcohol-ether mixture, precipitating a light-gray solid. Activity: 68,500 units per mg. The remainder is heated for ½ hour in 50 ml. of 0.1 N alkali and then neutralized with acetic acid. The activity is 420,000 units per ml.

We claim:

1. A method of preparing a member of the group consisting of tetrahydro-10-formylpteroic acid and amino acid amides of tetrahydro-10-formylpteroic acid and amino acid amides of tetrahydro-10-formylpteroic acid which comprises treating a compound of the group consisting of tetrahydropteroic acid and amino acid amides of tetrahydropteroic acid with formylating agents of the group consisting of formic acid, lower alkyl formates and glycol formate.

2. A method of preparing tetrahydro-10-formylpteroic acid amides of amino acids which comprises subjecting tetrahydropteroic acid amides of amino acids to the action of formylating agents of the group consisting of formic acid, lower alkyl formates and glycol formate.

3. A method which comprises the step of treating tetrahydropteroylglutamic acid with a formylating agent of the group consisting of formic acid, lower alkyl formates and glycol formate and recovering tetrahydro-10-formylpteroylglutamic acid therefrom.

4. A method which comprises the steps of treating tetrahydropteroylglutamic acid with ethyl formate in the presence of an alkali-metal alkoxide at a temperature within the range of 50° C. to 200° C. and recovering tetrahydro-10-formylpteroylglutamic acid therefrom.

5. A method which comprises the steps of subjecting tetrahydropteroylglutamic acid to the action of glycol formate in the presence of an alkali-metal alkoxide at a temperature within the range of 50° C. to 200° C. and recovering tetrahydro - 10 - formylpteroylglutamic acid therefrom.

6. A method which comprises the step of subjecting tetrahydropteroylglutamic acid to the action of formic acid at a temperature within the range of 0° C. to 100° C. and recovering tetrahydro-10-formylpteroylglutamic and therefrom.

References Cited in the file of this patent

O'Dell et al., J. Am. Chem. Soc. 69, 250–253 (1947).
Wolf et al., J. Am. Chem. Soc. 69, 2753–2759 (1947).
Gordon et al., J. Am. Chem. Soc. 70, 848–849 (1948.)